United States Patent [19]
Cardwell et al.

[11] 3,903,235
[45] Sept. 2, 1975

[54] METHOD FOR SEPARATING NICKEL FROM COBALT

[75] Inventors: Paul H. Cardwell, Zanoni; William S. Kane, Wicomico; James A. Olander, Gloucester Point, all of Va.

[73] Assignee: Deepsea Ventures, Inc., Gloucester Point, Va.

[22] Filed: Apr. 26, 1972

[21] Appl. No.: 247,692

Related U.S. Application Data

[63] Continuation-in-part of Ser. No. 40,564, May 26, 1970, Ser. No. 40,565, May 26, 1970, Ser. No. 40,587, May 26, 1970, Ser. No. 40,590, May 26, 1970, Ser. No. 40,586, May 26, 1970, and Ser. No. 40,585, May 26, 1970.

[30] Foreign Application Priority Data
May 20, 1971 Canada .................................. 113519

[52] U.S. Cl. .................. 423/24; 423/38; 423/49; 423/139; 423/150; 75/101 BE; 75/111
[51] Int. Cl.... C01g 3/00; C01g 45/00; C01g 51/00; C01g 53/00; C22b 3/00; C22b 15/00; C22b 23/00
[58] Field of Search ............ 423/49, 139, 138, 150, 423/24; 23/312 ME; 75/101 BE, 119, 117

[56] References Cited
UNITED STATES PATENTS

| | | | |
|---|---|---|---|
| 2,658,813 | 11/1953 | Whitehouse et al. ................. | 423/49 |
| 2,752,299 | 6/1956 | Cooper ................................ | 423/49 |
| 2,766,115 | 10/1956 | Graham et al. ..................... | 75/114 X |
| 2,777,755 | 1/1957 | Eberhardt ............................. | 423/49 |
| 3,085,875 | 4/1963 | McCarroll............................ | 423/49 |
| 3,128,156 | 4/1964 | Long et al. ...................... | 75/101 BE |
| 3,169,856 | 2/1965 | Mero .................................... | 75/119 |
| 3,224,873 | 12/1965 | Swanson ........................ | 75/101 BE |
| 3,276,863 | 10/1966 | Drobnick et al. .................... | 423/139 |
| 3,449,246 | 6/1969 | Pelka et al. ...................... | 75/101 BE |
| 3,455,680 | 7/1969 | Ashbrook et al. ................. | 75/119 X |
| 3,479,378 | 11/1969 | Orlandini et al. ................ | 75/101 BE |
| 3,666,446 | 5/1972 | Cook et al. ...................... | 75/101 BE |
| 3,703,573 | 11/1972 | Blytas .............................. | 75/119 X |

Primary Examiner—Oscar R. Vertiz
Assistant Examiner—Brian E. Hearn
Attorney, Agent, or Firm—Barry G. Magidoff

[57] ABSTRACT

A process is provided for separating nickel and cobalt; the process comprises extracting the nickel and cobalt together with a liquid ion exchange agent. Stripping the nickel from the extractant with an acidic aqueous solution and then stripping the cobalt with an aqueous solution at least 6N in hydrogen ion and in chloride ion concentration.

10 Claims, 1 Drawing Figure

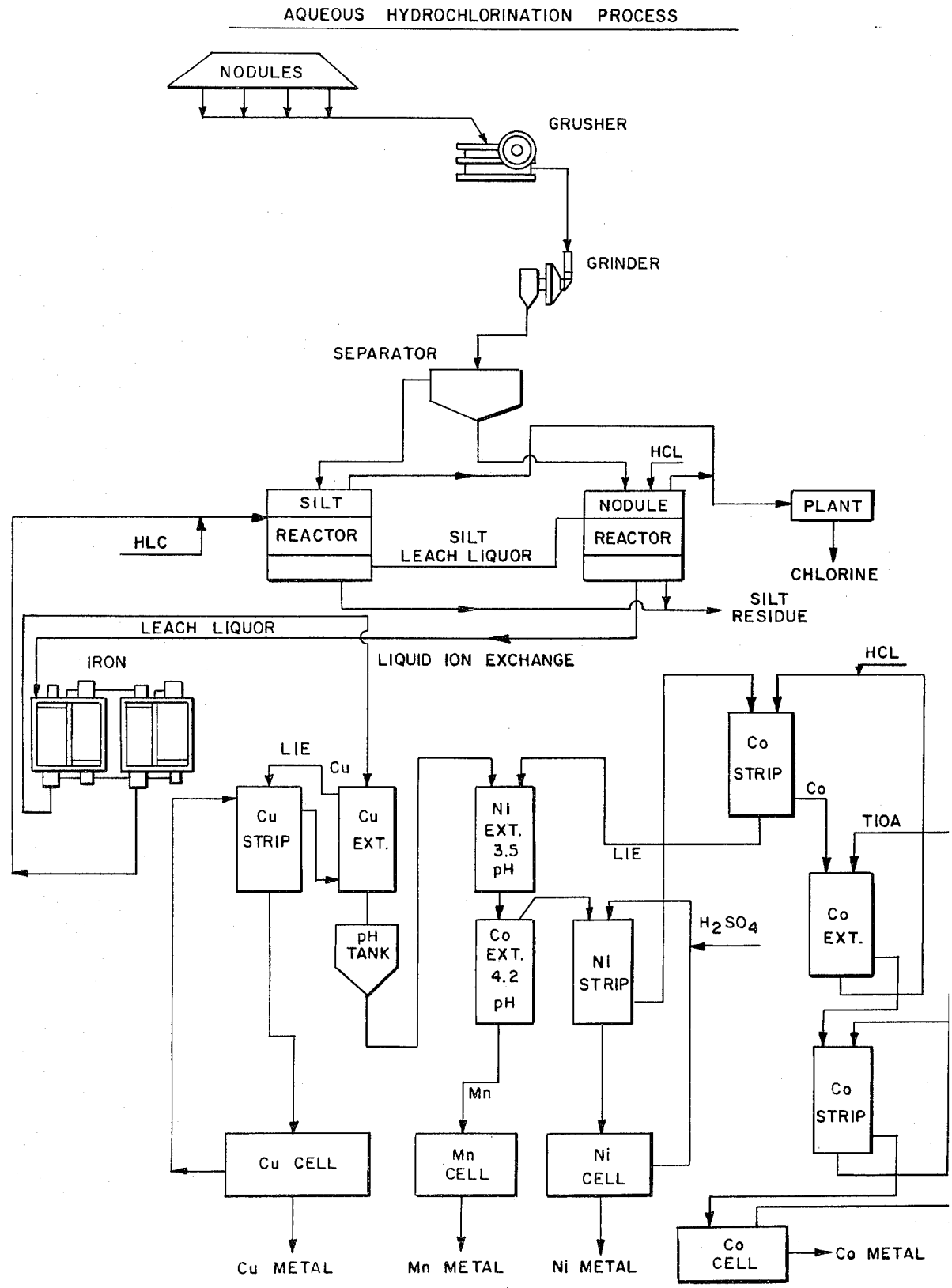

METHOD FOR SEPARATING NICKEL FROM COBALT

The application is a continuation in part of copending applications Ser. No. 40,564 filed May 26, 1970; Ser. No. 40,565, filed May 26, 1970; Ser. No. 40,587, filed May 26, 1970; Ser. No. 40,590 filed May 26, 1970; Ser. No. 40,586, filed May 26, 1970; Ser. No. 40,585, filed May 26, 1970.

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These do not require any stripping of the surface but can merely be scooped up or in other ways removed from the surface without actually rending the earth's surface.

Ocean floor nodules have been known since they were first collected in the first half of the 1870s. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown from the metal compounds which are dissolved in sea water, generally in the form of the metal oxides.

The nodules are formed in an extremely complex crystal matrix of iron and manganese oxides: tiny grains of each oxide of a size and type which are substantially impossible to separate with presently available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

The precise chemical composition of the nodules vary depending upon their location in the ocean. The variation apparently is caused by differences in temperature in various places, differences in composition of sea water, perhaps caused by the pressure and temperature variations at different depths and composition of adjacent land areas; variations in the amount of oxygen which is present in the water in different locations and perhaps other variables not readily apparent to observers. Generally, however, in almost all cases the metals which are present in major proportions are manganese and iron. A table in an article entitled "The Geochemistry of Manganese Nodules and Associated Deposits from the Pacific and Indian Oceans" by Croonan and Tooms in *Deep Sea Research* (1969), Volume 16, pages 335 – 359, Pergamon Press (Great Britain)) shows the relative compositions of the most valuable metals contained in nodules taken from different areas within the Pacific and Indian Oceans.

In accordance with one aspect of the present invention ocean nodule ore is refined by (1) reacting the nodules under acid, or salt-forming, -selective reducing conditions to form a mixture comprising the water-soluble salts of divalent manganese, copper, nickel, cobalt and trivalent iron; (2) separating out the iron from the products of the salt-forming-reduction reaction; (3) forming an aqueous solution of the metal salts and (4) separating the dissolved salts. Steps (2) and (3) can be in interchangeable and chronological order. Encompassed within steps (2) and (3) above are processes wherein a solution of all of the metal halides, including those of iron, cobalt, nickel, copper and manganese, are dissolved in water, and the iron is then removed, therefrom; also encompassed are processes wherein the iron halide is first converted to a water-insoluble material, e.g., iron oxide, and the remaining halides are dissolved in water and the solution separated from the insoluble iron material. If an aqueous solution is formed including dissolved iron, the iron can be separated by drying the solution and then converting the iron salt to iron oxide, by extracting of the iron directly, or by converting the dissolved ferric salt selectively to an insoluble form and removing it from the solution. The iron should be removed because it is present in sufficient quantities to interfere with the separation of the other, more valuable metals.

The acid-selective reduction process of this invention destroys the iron oxide-manganese oxide matrix of the nodule, freeing the various other metal values so that they may be separated out, while maintaining the iron in the more easily eliminated ferric state.

The acidic-selective reduction agents useful in the present procedure can be described as materials which will selectively reduce plus four valence state manganese but not ferric iron and will result in the formation of acid salts, e.g., halides, of the metals which are present. Preferred such agents include single compounds, such as the hydrogen halides, both in the gaseous state and in aqueous solution, and two-component mixtures wherein one component provides the acid effect, i.e. forms the metal salts, e.g. the halide portion, and a second component provides the reducing effect. Such materials include mixtures e.g., of a halogen as the salt-forming with a reducing agent, such as hydrogen, HCl, HBr, or carbon, or a source therof, such as a hydrocarbon or carbon monoxide. In either of the above general cases, the reaction results in the formation of manganous halide, ferric halide and the halides of the remaining metals which are present in the nodule. Useful halogens include fluorine, chlorine, bromine and iodine; however, because of availability and the economy of combined easy handling and high reactivity, chlorine is preferred. It is gaseous at normal temperatures, it is not overly reactive and it can thus be readily handled, but yet is sufficiently reactive so as to proceed quickly and at a high rate. Chlorine is the preferred halogen whether present as the hydrogen chloride or as the elemental chlorine. However, elemental bromine, iodine and fluorine, and the corresponding halide, e.g., hydrogen bromide, can also be utilized if available.

As the single component acid-selective reducing agent, a hydrogen halide is preferred. Preferably the hydrogen halide is utilized in the gaseous state.

The temperature of reaction is surprisingly, not at all critical as far as the halide formation-selective reduction reaction is concerned. Temperatures of from about minus (—) 40°C up to about 1,000°C can be successfully used at economic rates of reaction. However, it is preferred to operate at above the boiling point of aqueous HCl, i.e., about 110°C at atmospheric pressure, to avoid the formation of any aqueous liquid during the reaction, or of whichever hydrogen halide is present.

Regardless of the temperature of reaction and method of separation, the chemical reactions are substantially the same and can be summarized by the following reaction equations:

1. $MnO_2 + 4HCl \rightarrow MnCl_2 + 2H_2O + Cl_2$
2. $NiO + 2HCl \rightarrow NiCl_2 + H_2O$
3. $CuO + 2HCl \rightarrow CuCl_2 + H_2O$
4. $Co_2O_3 + 6HCl \rightarrow 2CoCl_2 + 3H_2O + Cl_2$, or $CoO + 2HCl \rightarrow CoCl_2 + H_2O$
5. (a) $FeO(OH) + HCl \rightarrow FeOCl + H_2O$ and/or (b) $FeO(OH) + 3HCl \rightarrow FeCl_3 + 2H_2O$ The ferric chloride which is formed during the aqueous hydrogen halide reaction can be separated from the remaining metal chlorides by evaporating the water, heating the salts up to a temperature of at least 200°C in the presence of water, thus forming the insoluble iron oxide. The remaining metal halides can then be redissolved in water and separated from the iron oxide as described above.

Alternatively, ferric chloride can be removed by other methods including extraction, utilizing materials which preferentially take up the iron from solution. Such materials, include, among the preferred compounds organic phosphates and amines. These compounds are generally dissolved in an inert organic liquid, preferably a hydrocarbon, such as aliphatic or aromatic petroleum liquids, in concentrations which can ragne from about 5 to about 30 percent by volume. It is known that the extractant power of such solutions can be further increased by utilizing a modifier or conditioner, such as an aliphatic alcohol, e.g., isodecanol. See U.S. Pat. No. 3,224,873 and No. 3,449,246.

The organic phosphates which can be used for preferentially extracting iron include preferably the trialkyl phosphates. Such materials have the general formula:

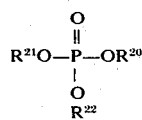

wherein the R groups may be the same or different and are preferably alkyl groups containing from 1 to 10 carbon atoms, optimally from two to six carbon atoms. Examples of such materials include tri-n-butyl phosphate, tri-n-hexyl phosphate, n-butyl-di-n-hexyl phosphate, n-propyl-di-n-butyl phosphate, tri-n-propyl phosphate and triamyl phosphate.

The amines which can be used for preferentially extracting iron include the primary, secondary, tertiary, and quaternary amines, e.g., $R_3 NCH_3^+ X^-$. Preferably the amines are aliphatic amines wherein each aliphatic group has from 1 to about 30 carbon atoms; preferably the total number of carbon atoms in the molecule being at least about 12 carbon atoms. Examples of the useful amine extractants include primary aliphatic amines having the formula $R - C(CH_3)_2 NH_2$, i.e., N-trialkylmethylamine, where R contains from about 18 to about 24 carbon atoms: secondary amines, such as N-lauryl-N-trialkylmethylamine, tertiary amines, such as TIOA triisooctylamine di(-n-octyl)n-hexyl amine, di(-n-hexyl)-n-octylamine, and the quaternary amines, especially in the form of the halide, (chloride), salts, wherein three of the aliphatic groups contain from about 5 to about 15 carbon atoms each and the fourth is preferably a lower alkyl group, e.g., methyl; examples of such preferred compounds include tri(n-$C_{8-10}$ alkyl) methyl ammonium chloride.

The ferric chloride is readily stripped from the phosphate or amine extractant by stripping with water. The thus regenerated extractant can be recycled.

The insoluble material can be separated from the aqueous leach solution containing the soluble metal halides by any of several methods including filtering, decanting, thickening or centrifugation, or any other procedure for separating liquids from solids. The leaching can be carried out by the batch or continuously; especially by counter-current flow. The solution of metal halides is then ready for separation into the individual metal compounds, in accordance with the present invention, preparatory to forming the elemental metals.

Preferably, pure water is not used as the leach liquid. An acid leach liquid is preferably used, one having a pH of not greater than about 4, and preferably not greater than about 3. It has been found that the optimum maximum pH for the leach liquid is about 2. The lower pH tends to increase substantially the proportion of copper halide which is dissolved. It is believed that at higher pH's, copper halide tends to hydrolyze, forming an insoluble product, which will remain behind with the iron oxide and gangue.

Preferably the leach liquid is maintained at substantially ambient temperatures. There is substantially little or no advantage in utilizing higher temperatures. The term "leach liquid" in this specification is applied to the aqueous solution utilized for dissolving water-soluble metal halides in order to separate then from insoluble gangue and iron oxides following a vapor-phase acid-selective reduction reaction.

Because of the rather complex mixture of materials which are obtained from such ocean floor nodules, many of the standard hydrometallurgical methods for separating out metal halides are not directly applicable because of the presence of various interfering ions. However, the following procedures can be utilized for obtaining at least the pure cobalt, copper, nickel and manganese halides.

In the preferred system for separating the halides, the copper halide is first removed from the aqueous solution. In describing the process, the chlorides are used as an example of the halides.

A group of materials known to the art as liquid ion exchange agents, can be utilized for the extraction of copper. Such materials include a group of substituted 8-hydroxyquinolines, α-hydroxy oximes and naphthenic acids. The oximes and quinolines generally are preferred because of their ability to separate more cleanly the various metal salts, and because the same compound can be used to extract each of the metals from solution.

The 8-hydroxyquinoline compounds, which are especially useful for the separation of the metal chlorides in accordance with the present process, can generally be defined by the following formula:

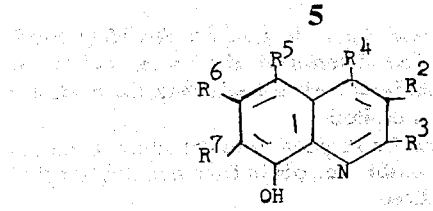

wherein each of the R groups can be hydrogen or a hydrocarbon group, or inertly substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R groups however must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent on the 8-hydroxyquinoline nuclear structure is such as to form preferentially a complex with the desired metal ion in the aqueous solution. The sum of the carbon atoms in the R groups must be at least about 8 and can be as high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines see Republic of South Africa specification No. 69/4397 to Budde Jr., et al., assigned to Ashland Oil, Inc.

Representative compounds useful in this invention and within the scope of the above general formula are: 7-octylbenzyl-8-hydroxyquinoline, 7-dodecylbenzyl-8-hydroxyquinoline, 7-nonylbenzyl-8-hydroxyquinoline, 7-ditertiarybutylbenzyl-8-hydroxyquinoline, 7-hexadecyl-8-hydroxyquinoline, 7-octadecyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-dicyclopentadienyl-8-hydroxyquinoline, 7-dodecylphenyl-8-hydroxyquinoline, 7-phenyldodecenyl 8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The 8-hydroxyquinolines are preferably utilized in solution in organic solvents, preferably hydrocarbon or chlorinated hydrocarbon solvents. Such preferred solvents include benzene, toluene, xylene, the various commercial mixtures of aromatic hydrocarbon solvents available on the market, aliphatic hydrocarbon solvents such as hexane-heptane mixtures, light fuel oil, kerosene and other hydrocarbons. Chlorinated such hydrocarbon solvents such as chlorobenzene, are useful in this regard. Generally liquid aliphatic cycloaliphatic, aromatic, cycloaliphatic-aromatic or aliphatic-aromatic hydrocarbons or chlorinated such hydrocarbons can be preferably utilized. Optimally, the solvents have specific gravities in the range of from about 0.65 to 0.95 and mid-boiling points in the range of from about 120° to 615°F (ASTM distillation). However, substantially any liquid can be used as a solvent that meets the following criteria: (1) a solvent for the extracting agent; (2) a solvent for the metal-containing chelate; (3) immiscible with water, and (4) readily separable from water. The extracting compound and the metal-containing such compound are both preferably soluble in the solvent to the extent of at least 2% by weight.

The second preferred type of metal extractant are the alpha-hydroxy oximes, which are disclosed inter alia in U.S. Pat. Nos. 3,224,873, 3,276,863 and 3,479,378. These materials have the general formula:

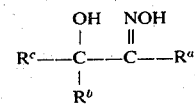

wherein the $R^a$, $R^b$ and $R^c$ groups can be any of a variety of organic, hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, and when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful R, R' and R'' groups include in addition to hydrogen, the mono-and polyunsaturated groups such as heptenyl, octenyl, decenyl, octadecenyl, octadecynyl, ethyl octadecenyl. Alkyl groups include 2-ethylhexyl, 2,3-diethylheptyl, 2-butyldecyl, 2-butylhexadecyl, 2,4-ethylbutyldodecyl, 4-butylcyclohexyl, and the like. Examples of the preferred alpha hydroxy omines include 19-hydroxyhexatriaconta-9, 27-dien-18-oxime; 5,10-diethyl-8-hydroxytetradecan-7-oxime; 5,8-diethyl-7-hydroxydodecane-6-oxime.

These alpha-hydroxy oximes are also utilized in an organic, water-immiscible solvent, in which they should be soluble to an extent of at least about 2% by weight. The useful solvents are set forth above for use with the 8-hydroxyquinoline compounds. The alpha-hydroxy oximes or the 8-hydroxyquinolines can be present in the solvent in amounts of from about 2 to 50% by weight, based on the total solution, but preferably in amounts of from about 2 to about 15% by weight.

Solutions of the extracting agents which are known as chelating agents, or "liquid ion exchange agent," generally are improved in their extracting efficiency by the presence of materials known as conditioners. Such conditioners include, long chain aliphatic alcohols, such as capryl alcohol, isodecanol, tridecyl alcohol and 2-ethylhexanol. The modifiers act, it is believed, by improving the phase-separating properties of the organic solvent from the aqueous leach liquid. the conditioners or modifiers, can be present in amounts of up to about 20% by volume of solution, and generally are aliphatic or cycloaliphatic of from 6 to 16 carbon atoms.

Beginning with an aqueous leach liquid containing dissolved copper halide, cobalt halide, nickel halide and manganese halide as the primary solutes, plus a variety of other metal halides in minor concentrations, the extraction of the individual metals can preferably be carried out by the following general procedure:

(1) adjust the pH of the leach liquid to a desirable pH, (2) mix the leach liquid with an immiscible organic liquid containing an extractant specific to a metal at that pH; preferably, copper is extracted initially at a pH of not greater than about 2.5, preferably from about 1.5 to about 2.5, and optimally of from about 1.8 to 2.2; the best results are obtained at a pH of about 2; (3) separate the aqueous raffinate from step (2), adjust the pH as necessary, and mix the raffinate with an immiscible organic liquid containing an extractant specific to another metal at the pH of the aqueous phase. Generally, nickel is extracted at a pH of from about 3 to about 6 and preferably about 3 to about 3.5 with chelating, or liquid ion exchange, agents, and cobalt is extracted at a pH of from about 3.5 to 7, preferably from 3.5 to about 6, optimally from 3.5 to about 5 and the most economical results at from 3.5 to about 4.5. At too high a pH, the manganese, nickel and cobalt tend to precipitate and this is preferably avoided. Further, increasing pH too much is expensive, in using up alkaline material.

In accordance with the present invention, the cobalt and nickel are extracted simultaneously and then selectively stripped from the extracting phase.

The ratio of cobalt and nickel removed from the leach liquid by the extractant is determined by the pH, i.e., the relative proportions of nickel and cobalt can be the same as that which is present in the leach liquid or it can have a greater proportion of nickel or a greater proportion of cobalt. Generally the higher the pH the greater the proportion of cobalt extracted. It is preferred, usually, to remove the nickel and cobalt in the same proportions as the metals are present in the leach liquid. Therefore, the pH for this ratio should be maintained during the extraction.

It is usually necessary to continually add alkaline material during the extraction stages in order to maintain the desired pH. The chelating agents act by releasing hydrogen ions when extracting metals, and thus the pH would tend to decrease during extraction. Caustic soda solution is preferably used. The sodium ion generally does not interfere with the further processing of any metal salt. However, other useful basic materials include generally alkali metal oxides and hydroxides, alkaline earth metal hydroxides and oxides, and their corresponding carbonates, such as calcium hydroxide, potassium hydroxide, lithium hydroxide, lithium carbonate, magnesium carbonate, calcium carbonate, ammonium hydroxide and carbonate, manganese hydroxide and manganese carbonate. Buffering agents can also be added; however, this can add an undesirable impurity to the leach liquid.

Each extraction step can be carried out with one or more extraction stages until the desired amount of metal is extracted.

4. The metal-containing organic extractant phases are stripped of the metal values by contacting with an aqueous stripping solution, generally an acidic solution is used. Generally, following stripping the extracting solution can be recycled to the process.

Copper can be readily stripped by any mineral acid, in an aqueous solution, having hydrogen ion concentration of from about 1N to about 10N and preferably from about 2N to about 6N. The concentration of hydrogen ion must be at least slightly in excess (preferably 5%) of the stoichiometric amount needed to substitute for the metal in the extract. The preferred acids include sulfuric acid, nitric acid, and hydrochloric acid. As the acid used determines the metal salt to be formed, this can be a basis for selecting the acid, if a particular salt is desired.

The cobalt can be stripped from the ammine extract using a weakly acidic, i.e., pH of from about 2 to about 3.5, water solution.

Where nickel and cobalt are extracted together, the nickel can first be stripped using a relatively weak acid aqueous solution, such as the mineral acids or the stronger organic acids, such as chloracetic acid, in a concentration of from about 0.01N to about 3N acid and preferably from 0.1N to about 1.0N. Cobalt can then be stripped from the chelate using a strong mineral acid aqueous solution in a concentration of at least 6N hydrogen ion and 6N chloride ion. Strong hydrochloric acid, containing at least 20% by weight HCl is preferred.

The aqueous raffinate leach liquid remaining after the cobalt and nickel are removed contains substantially all of the manganese halide which was leached from the nodule plus minor amounts of the halides of other metals.

Referring to the drawing accompanying this application, the drawing is a schematic flow diagram for the aqueous solution hydrohalogenation process.

The nodules as obtained from the ocean floor often are combined with material, of a silt-like nature, consisting primarly of quartz and silicates. The amount of this silt-like material is substantially decreased by crushing, milling and attritional scrubbing. The resulting particulate nodule material can be separated from the silt by conventional means such as a hydroclassifier. The overflow fraction generally contains the silt combined with fines. The silt is therefore separately reacted with HCl to remove these metal values. The underflow from the hydro classifier is passed to the acid-selective reducing reaction stage.

The reactor, as shown, is a multi-stage reactor system, wherein the nodules are passed counter-currently to the hydrogen halide solution, and the chlorine by-product is vented from each stage.

The reaction with the aqueous hydrogen halide solution proceeds with substantially any concentration of the hydrogen halide. However, to avoid having to handle excessive amounts of water, solutions of less than 1% by weight hydrogen halide should not be used. Preferably, a concentration of hydrogen halide of at least 10% by weight hydrogen halide is used. Optimally a saturated solution is used, e.g., 36% by weight HCl, and additional hydrogen halide vapor bubbled in during reaction. As shown in the drawing, the anhydrous hydrogen halide, exemplified by HCl, is bubbled into alternate stages through the aqueous solution.

The aqueous leach solution having the final reactor stage has a pH of not greater than about 2 to avoid precipitation of copper salt, and usually of from about 1 to about 2.

The final aqueous reaction liquid, containing the dissolved halides of manganese, iron, cobalt, nickel and copper, is then passed to a liquid ion exchange system to remove the iron by counter-current extraction with, e.g., an organic solution of a trialkyl phosphate or an amine. The ferric chloride is extracted from the leach liquid, stripped from the organic extract phase with water, the organic extraction solution is recycled for further use. The iron-free aqueous raffinate is then passed to a liquid ion exchange separation system, to separate the copper from the iron raffinate. Nickel and cobalt halides are separated from the solution by the below-described procedures preparatory to reducing to the respective metals.

The leach liquid filtrate is extracted with a liquid ion exchange agent specific to copper at the pH of the filtrate, approximately 2.0. The liquid ion exchange reagent, an oxime or an 8-hydroxyquinoline, is dissolved in organic solvent medium which is immiscible with the aqueous leach liquid. The extraction solution and leach liquid are contacted in any conventional liquid-liquid extraction equipment. Preferably a multi-stage counter-current flow extraction is carried out, either multiple mixer-settler stage or in extraction columns. The aqueous raffinate from the final stage is substantially depleted of copper.

The organic extract phase is stripped of its copper by contact with a sulfuric acid solution, having a hydrogen ion concentration of about 2N to about 6N, in this case recycled from the copper electrolytic cell. The copper is stripped out as copper sulfate, which can be directly fed to the electrolytic cell. The organic extracting solution is then recycled.

To the aqueous raffinate is then added an alkaline material to increase the pH to the desired value. The raffinate is then extracted again with a liquid ion exchange agent, such as an α-hydroxy oxime or an 8-hydroxyquinoline in 5 – 25 percent by volume solution. The pH of the aqueous phase is monitored and maintained at the necessary pH (3–3.5 for oximes or hydroxyquinolines) until most of the nickel is extracted, and the pH is then increased to at least 3.5, and preferably kept in the range of 3.5 to 4.5 until the remaining cobalt is extracted. The organic extract phase from the extraction system contains the cobalt and nickel, and the final raffinate aqueous phase is substantially depleted of these metals, and contains primarly manganese plus small quantities of other metals.

Alternatively, all of the nickel and cobalt can be removed by maintaining the pH of the aqueous phase during this extraction such that the ratio of nickel-to-cobalt which is extracted is substantially that in the leach liquid. This can be predetermined and the pH of the aqueous phase maintained to correspond to this proportion by continuously adding basic material during the extraction. Generally, the higher the pH the greater the proportion of cobalt which is extracted relative to the nickel, and vice versa.

The organic extract, which contains cobalt and nickel, is then stripped first of its nickel content using the aqueous chloride salt solution from a nickel electrolysis cell. To this solution is added sufficient make up HCl to increase hydrogen ion concentration to a sufficient degree to at least stoichiometrically replace the nickel from the extract; generally from about 2 to about 6N hydrogen in concentration is preferred. This is sufficient to strip out mickel without removing cobalt. The aqueous phase containing nickel is then fed to the nickel electrolytic cell.

The remaining organic phase layer is then further treated with a very strong aqueous solution of HCl containing at least 18% by weight of HCl: at least 6 N hydrogen ion concentration and 6 N chloride ion concentration. It is necessary that there be a sufficiently high chloride ion concentration to form the tetrachlorocobalt complex, which it is believed is needed in order to strip out cobalt. Although hydrochloric acid is preferred, as this provides both the necessary hydrogen concentration and chloride concentration, other strong mineral acids can be utilized in combination with soluble halide salts. The strongly acidic aqueous solution containing the cobalt as the only metal can then be extracted with a 5 – 30% solution of an organic tertiary amine, e.g., tri-2-ethylhexyl amine, readily stripped therefrom using the electrolyte solution from a cobalt cell, and the aqueous stripping phase fed directly to the electrolysis cell.

The nickel and cobalt chloride solutions are electrolyzed in aqueous electroplating cells of conventional type. The electrolysis solutions are continuously recycled as a stripping liquid to pick up make-up metal salt from the cells.

As shown, the residual copper after the copper remaining after extraction stage is removed by cementation on iron metal. The iron is removed by converting iron chloride to iron oxide.

One form of apparatus for use in fractionally subliming or condensing the respective halides include a set of rotating drums, as condensers, which are each maintained at a temperature below the sublimation temperature of the desired halide. The drums can be equipped with doctor blades which scrape the surface of the constantly rotating drums removing the deposits of the halides and carrying them away for further treatment as necessary.

EXAMPLE

Ocean floor nodule ore was obtained having the composition:

| Components | Percent by Weight |
| --- | --- |
| Manganese | 20 |
| Iron | 6.5 |
| Nickel | .88 |
| Copper | 0.55 |
| Cobalt | 0.12 |
| Other Metals | Minor |

The ore was ground to an average particle size of less than 35 mesh by passage through a pre-crusher and ball-mill, as shown in the drawing. The classified particles are then scrubbed in an attrition scrubber and the resulting material is separated into a silt fraction and an ore fraction in a hydroclassifier. The underflow ore fraction from the hydroclassifier is prereacted with an aqueous $FeCl_3$ solution, as shown in FIG. 4, and the mass is again treated in a hydroclassifier. The underflow is then passed through a 5-stage leaching-reactor system, countercurrent to an aqueous solution of hydrogen chloride, fed at an initial concentration of hydrogen ion of 11 Normal. The overflow solution from the final stage, which comprises an aqueous leach solution of manganese chloride, ferric chloride, cobalt chloride, nickel chloride and copper chloride havig a pH of 1 to 2 is next treated to remove iron chloride from the solution.

The leach solution, having a pH of 2 is passed through 4 mixer-settler stages, countercurrent to an organic solution comprising 20% by volume N-lauryl-N-(1,1-dimethylhexyl)-amine, i.e., having the formula

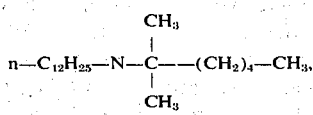

20% by volume isodecanol and kerosene diluent, at an aqueous-to-organic ratio of 1:2, by volume.

The organic extract is stripped with water, having a pH of 2 in a countercurrent, 3-stage mixer-settler system at an organic to aqueous ratio of 2:1 by volume. The aqueous stripping solution of $FeCl_3$ is then passed to the $FeCl_3$ pre-reactor.

The aqueous raffinate from the $FeCl_3$ extraction has substantially the same composition as set forth above in Example 1 and is adjusted to a pH of about 2. The raffinate is extracted with a solution comprising 10% by volume 7-[3-(5,5,7,7-tetramethyl-1-octenyl)]-8-hydroxyquinoline, 20% by volume isodecanol in Napoleum hydrocarbon solvent, in a 4-stage, countercurrent mixer-settler system at a volume ratio of organic-to-aqueous phases of 2:1. The organic phase is stripped with the sulfuric acid solution generated in an aqueous copper sulfate electrolysis operation in a countercurrent, 3-stage mixer-settler system. The regenerated organic phase is recycled and contacted with the leach liquid from which the ferric chloride has been removed.

The pH of the copper raffinate is adjusted to a pH of about 3.5 and then contacted with the organic extract solution, as above. After substantially all of the nickel is removed from the aqueous phase, the pH of the aqueous phase is increased by the addition of 2N ammonia solution to about 4.2 and the extraction continued until the cobalt is extracted.

The final organic extract phase, containing substantially all of the nickel and cobalt is first selectively stripped of the nickel using the electrolyte solution from a nickel aqueous electrolyzer cell to which has been added sufficient HCl to replace the nickel in the hydroxyquinoline. The organic solution and stripping liquid are passed countercurrently through a 3-stage mixer-settler system at a volume ratio of organic-to-aqueous of 2:1. Substantially no cobalt is stripped out.

Cobalt is extracted from the organic phase with an aqueous solution of 20% by weight HCl in a 4 stage countercurrent system. The cobalt is re-extracted from the strong acid solution using 10% by volume triisooctylamine solution in kerosene, also containing 20% by volume isodecanol. The cobalt is then stripped from the amine solution using the electrolyte from a cobalt aqueous electrolysis cell.

The above examples are directed to metal chlorides. However, the organic extraction materials which are utilized are not specific to any particular anion, but are effective with the metal salts of any strong mineral acid. For example, depending upon the method by which the solution is obtained from the ocean floor nodule ore, the metal solution can be in the form of sulfate salts, phosphate salts, chloride salts, bromide salts or nitrate salts.

Solutions of salts other than halides can be derived from ocean nodules by various procedures. For example, sulfate solutions of the metal values found in nodules can be obtained by the salt forming-reduction procedure defined in co-pending application Ser. No. 40,586, filed May 26, 1970, commonly assigned.

The invention is claimed as follows:

1. A process for the separation of individual metal compounds from an aqueous solution of metal halides comprising as the primary solute, a compound of manganese, and as secondary solutes, compounds of cobalt and nickel, the process comprising (1) adjusting the pH of the solution to a value within the desired range of from about 3 to about 6; (2) contacting the aqueous solution with an organic solution of a liquid ion exchange agent, the agent being selected from the group consisting of α-hydroxy oximes and hydrocarbon-substituted-8-hydroxyquinolines, to extract nickel and cobalt and maintaining the pH within the desired range until the aqueous solution is substantially depleted in nickel and cobalt, thus forming an organic extract liquid solution containing dissolved nickel and cobalt values and an aqueous raffinate containing manganese compound and substantially depleted in nickel and cobalt; (3) selectively stripping the nickel value from the organic extract with an acidic aqueous solution of a mineral acid, which does not strip cobalt, to form an organic phase substantially depleted of nickel and an aqueous phase containing a nickel salt; and (4) stripping the cobalt value from the organic phase using an aqueous acid solution containing a hydrogen ion and a halide ion concentration of at least 6N each to form an organic phase substantially depleted in nickel and cobalt values and an acidic aqueous phase containing a cobalt halide.

2. A process in accordance with claim 1 comprising, in addition, (5) contacting the acidic aqueous phase with an organic amine solution to extract the cobalt value to form an organic amine complex containing the cobalt value, and (6) stripping the cobalt value form the amine with an aqueous liquid form an aqueous solution of the cobalt halide.

3. A process in accordance with claim 1, wherein the liquid ion exchange agent is a hydrocarbon-substituted 8-hydroxyquinoline substituted in the 7-position with a beta-alkenyl group or an alkylbenzyl group.

4. A process in accordance with claim 1, wherein the liquid ion exchange agent is an α-hydroxyoxime wherein in the formula:

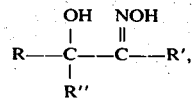

R and R' are selected from the group consisting of unsaturated hydrocarbon and branched chain alkyl groups containing from about 6 to about 20 carbon atoms and R'' is selected from the group consisting of hydrogen and unsaturated hydrocarbon and branched chain alkyl groups containing from about 6 to about 20 carbon atoms.

5. A process in accordance with claim 1, wherein the nickel is stripped from the extract with an aqueous solution having a concentration of hydrogen ion of from about 0.1 to about 3 Normal.

6. A process for obtaining, individually, the nickel and cobalt values from ocean floor nodule ore, the ore comprising, as major components, the oxides of manganese and of iron, and as secondary components, compounds of copper, cobalt and nickel, the process comprising the steps of (a) reacting the ocean floor nodule ore with a halide-forming agent under reducing conditions to form a mixture comprising the corresponding watersoluble metal halide salts of divalent manganese, trivalent iron, copper, nickel and cobalt; (b) separating the iron from the remaining salts and forming an aqueous solution of the watersoluble metal halide salts; (c) adjusting the pH of the aqueous solution to a value of not greater than about 2.5; (d) contacting the aqueous solution with a liquid ion exchange extracting medium immiscible with water, the medium comprising an extracting agent selected from the group consisting of substituted 8-hydroxy-quinolines, alphahydroxy oximes, and napthenic acids to extract copper selectively from the solution, until the aqueous solution is substantially depleted in copper, thus forming an organic extract containing the copper value and a first aqueous raffinate solution substantially depleted in copper; (e) adjusting the pH of the first aqueous raffinate solution to a value within the desired range of from about 3 to 6; (f) contacting the first raffinate with an organic solution of a liquid ion exchange agent, the agent being selected from the group consisting of $\alpha$-hydroxy oximes and hydrocarbon-substituted-8-hydroxy-quinolines, to extract nickel and cobalt and maintaining the pH within the desired range until the aqueous solution is substantially depleted in nickel and cobalt, thus forming an organic extract liquid solution containing dissolved nickel and cobalt values and an aqueous raffinate containing manganese compound and substantially depleted in nickel and cobalt; (g) selectively stripping the nickel value from the organic extract with an acidic aqueous solution of a mineral acid, which does not strip cobalt, to form an organic phase substantially depleted of nickel and an aqueous phase containing a nickel salt; and (h) stripping the cobalt value from the organic phase using an aqueous acid solution containing a hydrogen ion and a halide ion concentration of at least 6N each to form an organic phase substantially depleted in nickel and cobalt values and an acidic aqueous phase containig a cobalt halide.

7. A process in accordance with claim 6, wherein the nickel is stripped from the extract with an aqueous solution having a concentration of hydrogen ion of from about 0.1 to about 3 Normal.

8. A process for the separation of nickel value from cobalt value from an aqueous solution of metal halides comprising as the primary solute, a compound of manganese, and as the secondary solutes, compounds of cobalt and nickel, by extraction from an aqueous solution followed by selective stripping, the process comprising: (1) contacting the aqueous solution with an organic solution of a liquid ion exchange agent, the agent being selected from the group consisting of alphahydroxy-oximes and hydrocarbon-substituted-8-hydroxyquinolines, to extract both nickel and cobalt from the aqueous solution while maintaining the pH within a desired range of from about 3 to about 6 until the aqueous solution is substantially depleted in nickel and cobalt, thus forming a liquid organic extract solution containing dissolved nickel and cobalt values and an aqueous raffinate containing manganese compound and substantially depleted in nickel and cobalt; and (2) selectively stripping the nickel value from the organic extract solution with an acidic aqueous solution of mineral acid, which does not strip cobalt, to form an organic phase containing cobalt and substantially depleted of nickel and an aqueous phase containing a nickel salt, and substantially free from cobalt.

9. A process in accordance with claim 8, wherein the nickel is stripped from the extract with an aqueous solution having a concentration of hydrogen ion of from about 0.1 to about 3 Normal.

10. A process in accordance with claim 9, wherein the compounds of cobalt and nickel are chlorides.

* * * * *

UNITED STATES PATENT OFFICE
CERTIFICATE OF CORRECTION

PATENT NO. : 3,903,235
DATED : September 2, 1975
INVENTOR(S) : PAUL H. CARDWELL, et al.

It is certified that error appears in the above-identified patent and that said Letters Patent are hereby corrected as shown below:

Column 12, line 33, change " form " to -- from --;

line 34, between " liquid " and " form ", insert -- to --.

Signed and Sealed this eleventh Day of May 1976

[SEAL]

Attest:

RUTH C. MASON
Attesting Officer

C. MARSHALL DANN
Commissioner of Patents and Trademarks